United States Patent
Zhang et al.

(10) Patent No.: US 7,512,172 B2
(45) Date of Patent: Mar. 31, 2009

(54) PATH SEARCH METHOD FOR CDMA COMMUNICATION SYSTEMS

(76) Inventors: Yan Zhang, Room 18, Building 1, 78 BanCang Street, Nanjing 210024 (CN); Jingdong Lin, 32 Fern Pine, Irvine, CA (US) 92618

( * ) Notice: Subject to any disclaimer, the term of this patent is extended or adjusted under 35 U.S.C. 154(b) by 740 days.

(21) Appl. No.: 10/955,747

(22) Filed: Sep. 30, 2004

(65) Prior Publication Data

US 2006/0067384 A1    Mar. 30, 2006

(51) Int. Cl.
*H04B 1/00*    (2006.01)
(52) U.S. Cl. ..................................... 375/147
(58) Field of Classification Search ................ 375/130, 375/136, 147, 140, 142, 143, 149, 150, 152
See application file for complete search history.

(56) References Cited

U.S. PATENT DOCUMENTS

| | | | | |
|---|---|---|---|---|
| 5,305,349 A | * | 4/1994 | Dent | ............................ 370/209 |
| 5,931,893 A | * | 8/1999 | Dent et al. | ................... 708/422 |
| 6,330,292 B1 | * | 12/2001 | Dent et al. | ................... 375/343 |
| 6,512,785 B1 | * | 1/2003 | Zhou et al. | ................... 375/143 |
| 6,621,858 B2 | * | 9/2003 | Sourour et al. | ............... 375/150 |
| 6,842,480 B1 | * | 1/2005 | Yang et al. | .................... 375/152 |
| 2001/0002919 A1 | * | 6/2001 | Sourour et al. | ............... 375/150 |
| 2004/0076223 A1 | * | 4/2004 | Krasner et al. | ............... 375/143 |

\* cited by examiner

*Primary Examiner*—Chieh M Fan
*Assistant Examiner*—Jaison Joseph

(57) ABSTRACT

The embodiments of this invention relate generally to wireless telecommunication systems and, more particularly, to spread spectrum code division multiple access communication systems that employ a pilot-channel for path search and acquisition and for allocating fingers of a multifinger correlator, such as one found in a RAKE receiver. While the path search is an important part of the RAKE process, conventional path search methods require a large storage space for implementing the required correlation algorithms. One of the advantages of this invention is the noticeable reduction of the required storage space.

14 Claims, 4 Drawing Sheets

PATH SEARCH METHOD FOR CDMA COMMUNICATION SYSTEMS

TECHNICAL FIELD

This invention relates generally to wireless telecommunication systems and, more particularly, to path searching for a CDMA (Code Division Multiple Access) communication system.

BACKGROUND

Mobile communication is increasingly popular and, more and more, cellular service providers are focusing on techniques for high-capacity and high-quality communication of information over wireless links.

In 1998 the Chinese Wireless Telecommunications Standards proposed to the International Communications Union a new standard that is based on Time Division Duplexing (TDD) and Synchronous Code Division Multiple Access (CDMA) technology (TD-SCDMA) for TDD. The International Communications Union has approved and adopted this proposal. In a TD-SCDMA system, time slots and spreading codes separate the users in a cell. The adopted system has several advantages over $2^{nd}$ generation and other $3^{rd}$ generation communication systems.

Cells are distinct geographic areas serviced by a wireless telecommunications system, and, depending on the topography of the terrain surrounding the cells, they may have irregular shapes. Typically, each cell contains a base station that communicates with the wireless terminals in that cell and with the Wireless Switching Center, which is the heart of a typical wireless telecommunications system. The Wireless Switching Center is responsible for, among other things, establishing and maintaining calls between wireless terminals and between a wireless and a wireline terminal.

Often, the signal transmitted by a wireless terminal to a base station is radiated omnidirectionally from the wireless terminal. While some of the transmitted signal may reach the base station in a direct, line-of-sight path, most of the transmitted signal radiates in other directions and never reaches the base station. However, some of the signals that radiate initially in a direction other than towards the base station strike an object, such as a building, and are reflected towards the base station.

Therefore, a signal can radiate from the wireless terminal and be received by the base station via multiple signal paths. Such a signal and its reflections arrive at the base station at different times, after having traveled on different paths, and will interfere to form a composite of several constituent signals. This is known as "multipath" interference. Furthermore, the characteristics of each received signal are affected by the length of the path traveled and the objects the signal has been reflected from.

In a CDMA system each radio receiver attempts to identify and isolate the highest-quality constituent signals of a composite multipath signal and to demodulate and recombine them to form an estimate of the transmitted signal. This process is conducted with, among other things, a RAKE receiver. A RAKE receiver uses several baseband correlators and individually processes multipath signal components, attempting to identify the strongest constituent signals in the composite signal. Each correlator in a RAKE receiver is called a "finger." The RAKE receiver then isolates and demodulates each of the strongest constituent signals, and then recombines them to produce a better estimate of the transmitted signal than could be obtained from any single constituent signal Because each received signal travels a different path, any discrepancy is manifested as a relative time delay, or phase shift, in the constituent signals. Any phase shift in a constituent signal that does not exactly equal an integral number of wavelengths of the carrier signal translates into a partial phase rotation in the constituent signal with respect to the other constituent signals. The partial phase rotation of the constituent signals at the receiver is irrelevant and does not affect the demodulation process if the modulation scheme of the transmitted signal does not function by modulating the phase of the carrier. In contrast, the partial phase rotation of the respective signals must be considered in the demodulation process if the modulation scheme of the transmitted signal functions, at least in part, by modulating the phase of the carrier signal (e.g., quadrature phase-shift keying, quadrature-amplitude modulation, etc.). Typically, the partial phase rotation of the respective signals is accounted for by realigning their phase.

In the prior art, a technique called "pilot-aided CDMA" facilitates the task of realigning the phase of the respective constituent signals. In a pilot-aided CDMA system a pilot signal is transmitted in the same channel as the information-bearing signal and traverses each path from the transmitter to the receiver, and is subject to the same environmental factors as the information-bearing signal. Because the RAKE receiver knows that the phase of the pilot signal, as transmitted, is invariant, it can estimate the phase rotation of each constituent information-bearing signal by comparing that signal to the pilot signal and its reflections.

In many environments such as crowded cities, fading, which is related to multipath interference, can become quite severe. The term "fading" is used when the amplitude of the received signal drastically varies as a result of the phase difference between a signal and its reflections. Such signals, at times, can weaken or practically cancel each other, or can combine to form a stronger signal. In a wideband direct-sequence spread-spectrum CDMA communication system (WCDMA), where signals use separate slices of the total available wideband, different multipath components fade independently and the diversity reception of the signal is the method of choice. Most often the RAKE receivers are used to implement the diversity reception technology. The RAKE receiver, in turn, is based on the path search method. In general, no matter which kind of diversity reception technology is adopted, path researching is required. However, the conventional path search structures entail a large storage space to implement the necessary correlation algorithms.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein.

DETAILED DESCRIPTION

Figure 1:
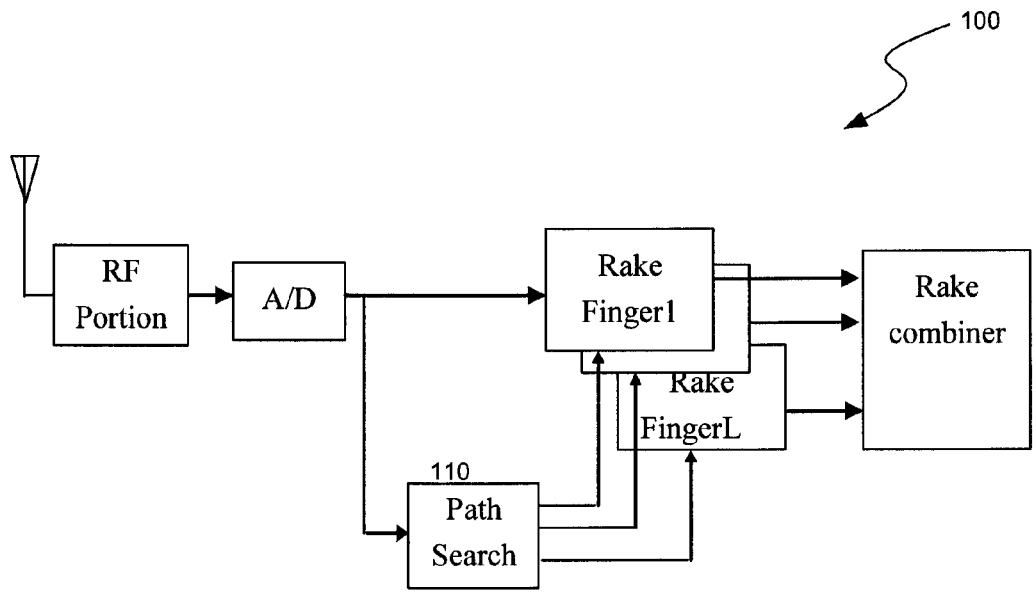
FIG. 1 is a schematic diagram of a typical RAKE receiver structure within a CDMA system.

This invention relates generally to wireless telecommunication systems and, more particularly, to spread spectrum code division multiple access communication systems that employ a pilot-channel for path searching and acquisition and for allocating fingers of a multifinger correlator, such as one found in a RAKE receiver. FIG. 1 is a schematic diagram of a typical RAKE receiver structure 100 within a CDMA system. The path search 110 is an essential part of the RAKE processes; however, conventional path search systems require a large storage space for implementing the necessary correlation algorithms. One of the advantages of this invention is the reduction of the required storage space, and although storage space is not expensive, it makes a difference with regard to ASICs (Application-Specific Integrated Circuit). In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this "Detailed Description" section.

Figure 2:
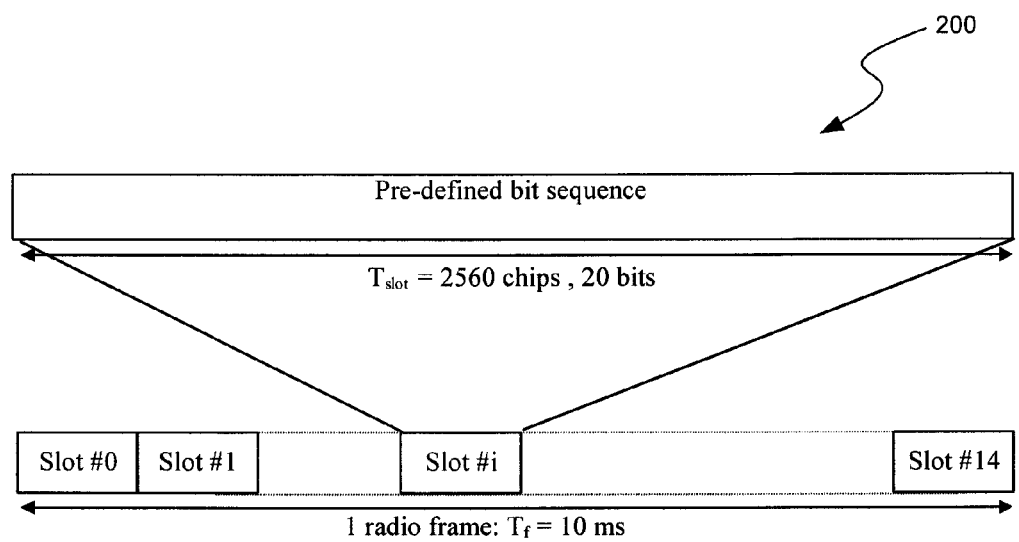
FIG. 2 illustrates the frame structure of a common pilot channel in a WCDMA system.
Figure 3:
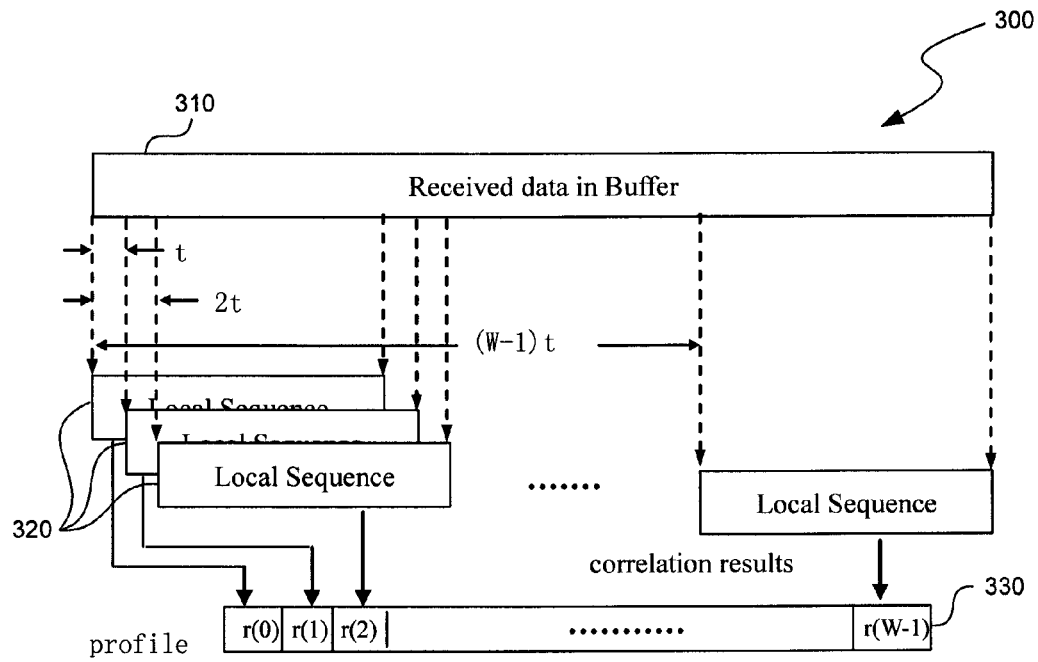
FIG. 3 depicts a conventional path search process.
Figure 4:
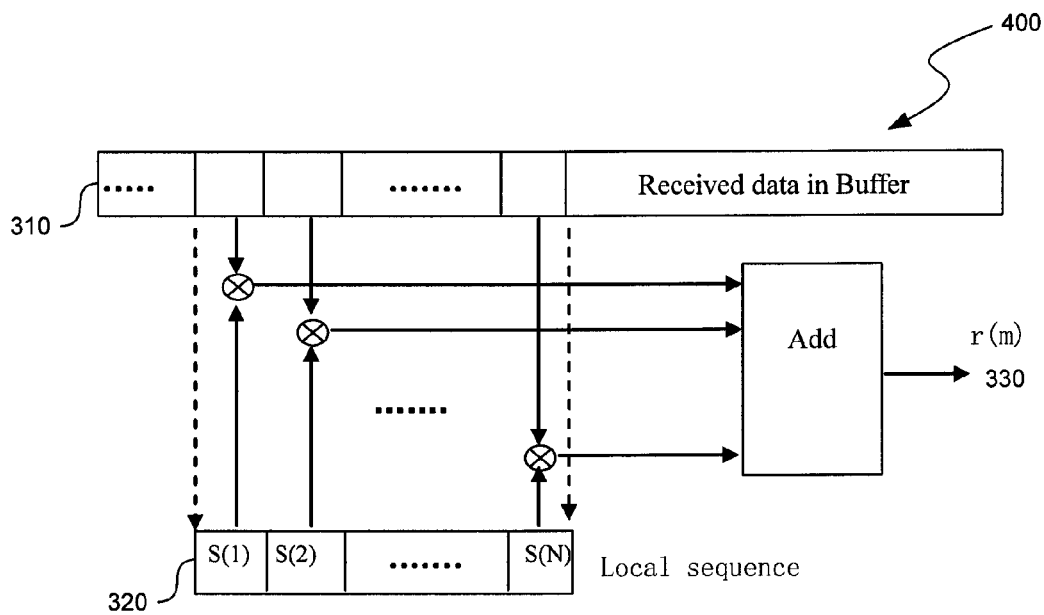
FIG. 4 illustrates a correlation process performed as the core part of the path search process depicted in FIG. 3.

Reference throughout the specification to "one embodiment" or "an embodiment" means that a particular feature, structure, implementation, or characteristic described in connection with the embodiment is included in at least one embodiment of the present invention. Thus, the phrases "in one embodiment" or "in an embodiment" in various places throughout the specification do not necessarily all refer to the same embodiment. Furthermore, the particular features, structures, implementations, or characteristics may be combined in any suitable manner in one or more embodiments. A typical path search method for use with a CDMA reception device generates a delay profile for different paths traveled by a signal to reach the receiver and detects a few paths having high reception levels in the delay profile, later to be RAKE-combined. Delay profiles are generated using common pilot channels. In CDMA mobile communication systems, such as WCDMA and CDMA2000, there is a downlink physical channel called a "common pilot channel" that carries a predifined periodical bit sequence. The same channelization code, or bit sequence, is always used for the common pilot channel. The common pilot channel is broadcasted over the entire cell in the same channel as the information-bearing signal, as a phase reference for other downlink channels. A pilot signal is subject to the same environmental factors as an information-bearing signal. FIG. 2 illustrates the frame structure 200 of a common pilot channel (CPICH) in a WCDMA system (Wideband CDMA). In the following paragraphs, without loss of generality, a WCDMA system is adopted to present the concepts of this invention. FIG. 3 depicts the core of a conventional path search process 300. Initially, the received data in the conventional path search process 300 is saved in a buffer 310 and, subsequently, a local sequence 320 is correlated with it. This local sequence is usually the conjugate of the transmitted predefined CPICH bitsequence, which itself is spread and coded in chips. The coding or spreading is accomplished by multiplying the signal by a unique high rate digital sequence which stretches (spreads) its bandwidth before transmission. Each code-bit is called a "chip." In FIG. 3, $T_c$ denotes one chip interval. The local sequence is slid along the data buffer, step by step, from 0, t, 2t, ..., (W−1)t, and at each step the correlation result r is stored in the profile register, where t is the sample interval of the received data. t may be one, a half, or a quarter of $T_c$, depending on the number of samples that has been taken per received chip. By default, one sample of the received signal is taken per chip, in which case $t=T_c$. However, to increase the accuracy of synchronization, oversampling may be used. In total, W correlation results r(0) through r(W−1), 330, will be composed. A spike at any correlation step indicates a match with the correct code, and the polarity of the spike indicates the data value. FIG. 4 illustrates the correlation process 400 of the conventional path search illustrated in FIG. 3; however, the correlation process and its details are known to anyone of ordinary skill in the art. The correlation results comprise the delay profile of the multipath fading environment of the propagation, where Wt is the length of the path search window. In FIGS. 3 and 4, if N denotes the (integral) length of the correlation algorithm, the path search portion must hold or store at least as many as $[W-1+N(T_c/t)]$ received data. And if a data unit is quantified by K bits, the buffer must hold at least $K[W-1+N(T_c/t)]$ bits. Considering the fact that it should also hold N bits of the local sequence, the required storage space for a conventional path search process, such as the one illustrated in FIG. 3, is $\{K[W-1+N(T_c/t)]+N\}$ bits.

Figure 5:
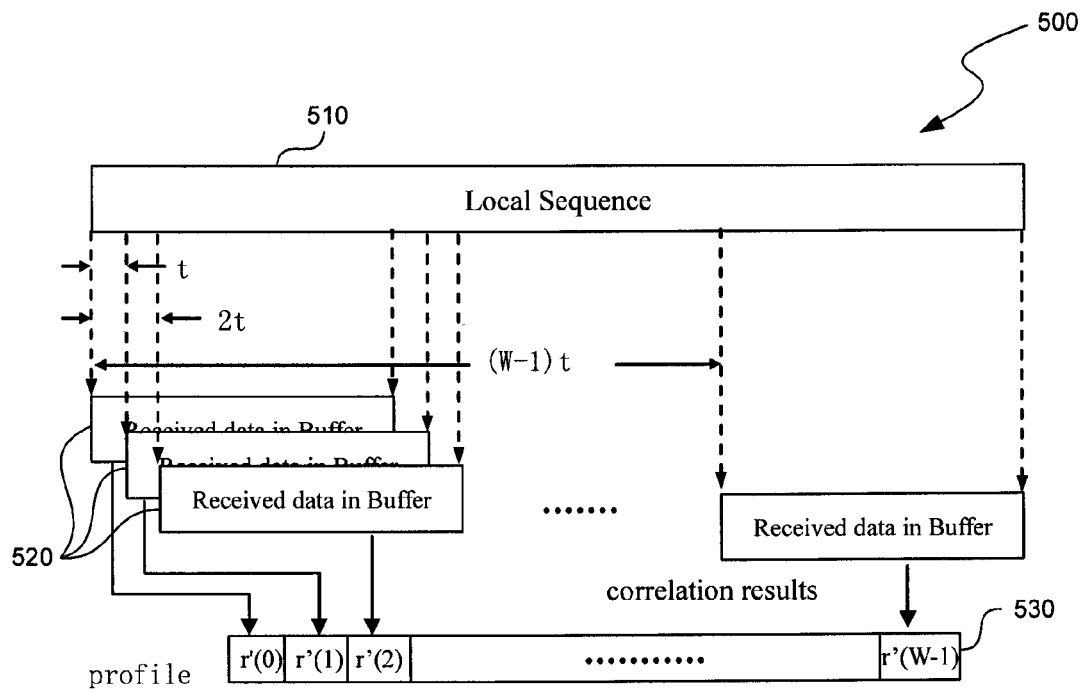
FIG. 5 is a schematic diagram of a path search method, in accordance with an embodiment of the present invention.

FIG. 5 illustrates the core of a path search process 500, in accordance with an embodiment of the present invention. The overall architecture of this embodiment is somewhat similar to the architecture of a conventional path search structure; however, in the proposed architecture, the two storage locations for the received data and the local sequence are switched. Therefore, in the proposed structure, in contrast with the conventional structure, the received data is slid against the local sequence and, as will be illustrated, less storage area will be needed.

Figure 6:
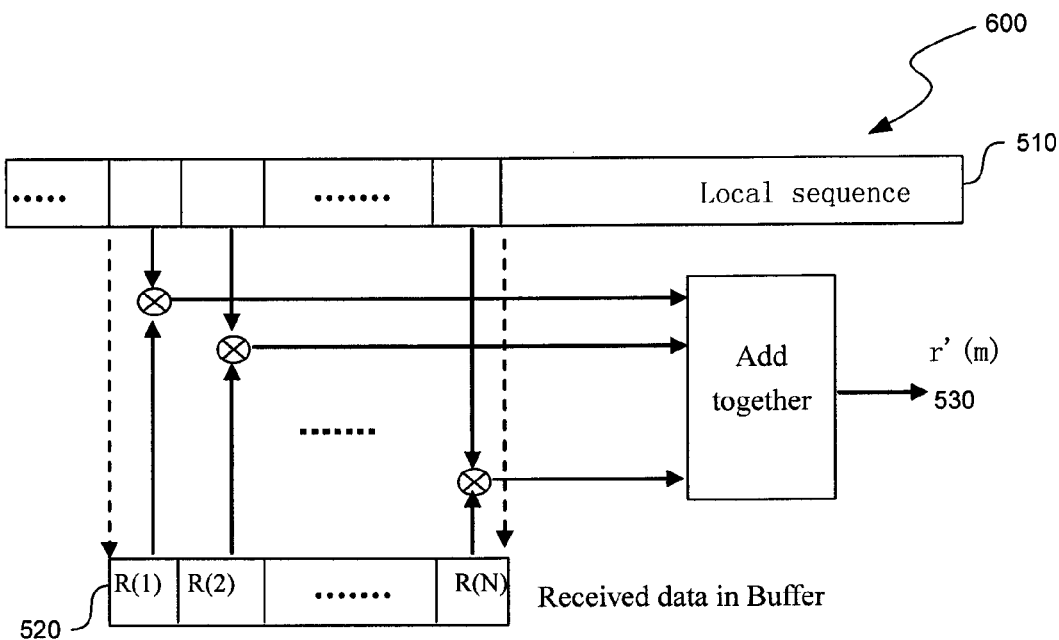
FIG. 6 is a schematic diagram of a correlation process performed as the core part of the path search process depicted in FIG. 5.

The aspects of this embodiment can save most of the storage space while having an identical performance to the conventional path search 300. In FIG. 5, the multipath delay profile 530 is denoted by r'(n)=r(W−1−n), where n=0,1, ..., W−1. Theoretically, r' is just the reversal of the profile r of the conventional method. FIG. 6 illustrates the correlation process 600 of the path search illustrated in FIG. 5.

The proposed path search structure of FIG. 5 should hold (W−1+N) of the local sequence 510 and N($T_c$/t) of the received data 520. Although the local sequence is N-bit long, as mentioned above, it can be repeated as many times as required to fill any available memory space, which in this case is (W−1+N) bits of memory. As a result of the proposed arrangement, there is only a need for Nk($T_c$/t) /t) bits of storage space for the received data to be able to correlate with an N-bit local sequence. Note that k is the bit-length of a received data unit, which is the result of sampling and quantizing a received signal.

Therefore, the total storage space for this embodiment of the invention is $[W-1+N+NK(T_c/t)]$ bits, which is less than the $\{K[W-1+N(T_c/t)]+N\}$ bits required by a conventional path search structure. The saved storage space is (W−1)

(K−1) bits, which can be large if W and K are large, such as with an expanded path search window and a larger number of bits per data units.

Figure 7:
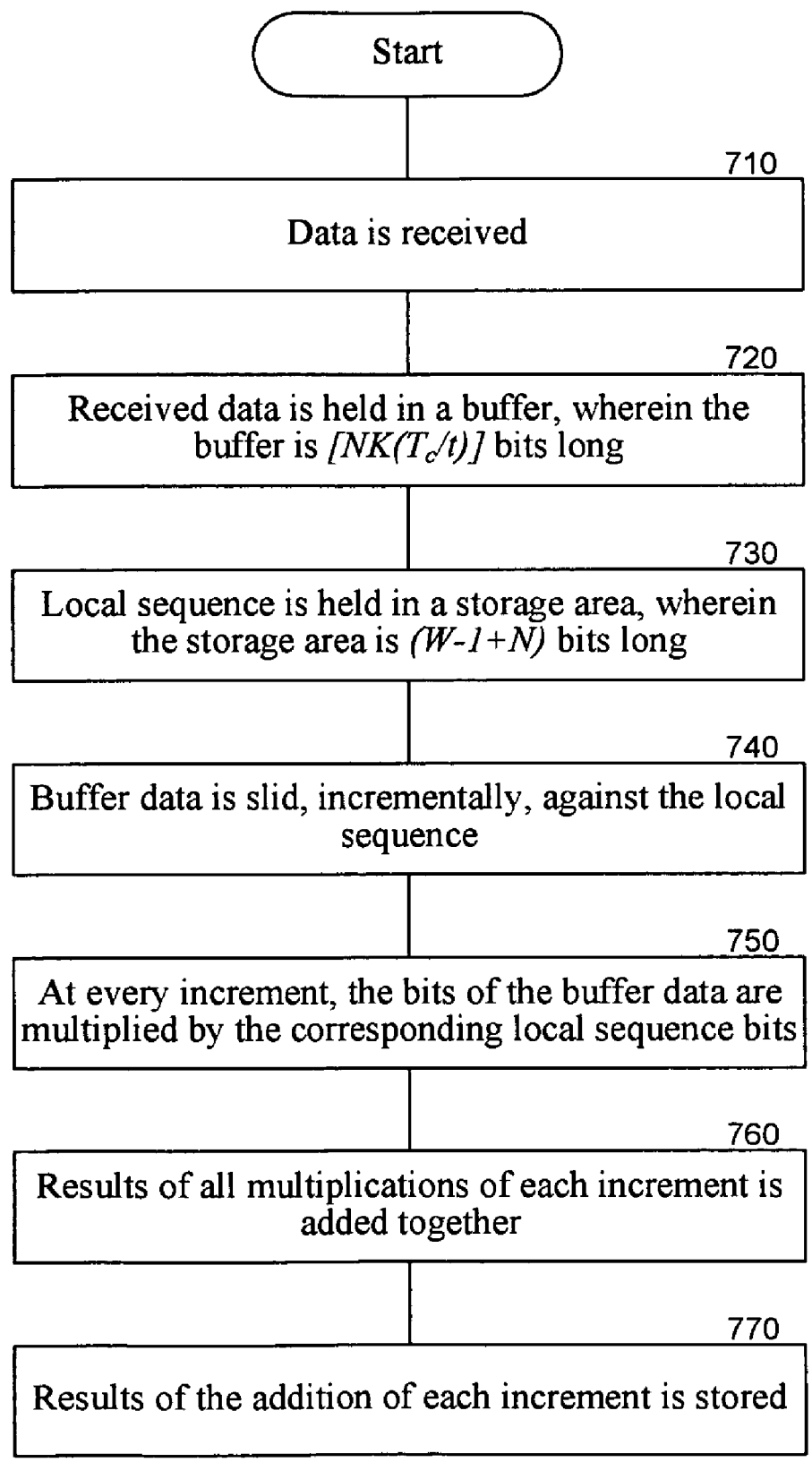
FIG. 7 is a block diagram of a path search method in a CDMA system, in accordance with an embodiment of the present invention.

FIG. 7 is a block diagram of a path search method 700 in a CDMA system, in accordance with an embodiment of this invention. At step 710 data is received. At step 720 the received data is held in a buffer, wherein the buffer is [NK($T_c$/t)] bits long, K is the length of a data unit in bits, $T_c$ is one chip interval, t is the sampling interval, and N is the correlation algorithm (integral) length. At step 730 a local sequence is held in a storage area, wherein the storage area is (W−1+N) bits long, W is the number of correlation results, and N is the correlation algorithm (integral) length. At step 740 the buffer data is slid, incrementally, against the local sequence, wherein each increment is equal to the sample interval of the received data. At step 750, at every increment, the buffer data is multiplied by the corresponding local sequence bit-by-bit. At step 760 the results of all multiplications of each increment are added together. At step 770 the results of the addition of each increment are stored.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the "Detailed Description" section using the singular or plural number may also include the plural or singular number, respectively. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily to the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless this "Detailed Description" section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A correlation system for the path search in a code division multiple access communication system employing a pilot-channel for path searching and acquisition and for allocating fingers of a multi-finger RAKE, the path search correlation system comprising:
   a multiplier;
   an adder; and
   a data storage for holding a local sequence and received data, where the local sequence is stored in a (W−1+N)-bit long storage area and the received data is stored in a [NK($T_c$/t)]-bit long storage area, and wherein:
   W is a total number of correlation results;
   N is the correlation algorithm (integral) length;
   K is the length of a data point in bits;
   $T_c$ is one chip interval; and
   t is the sampling interval.

2. The correlation system of claim 1, wherein the correlation algorithm length is the same as the length of the local sequence.

3. A path search correlator in a RAKE section of a CDMA (Code Division Multiple Access) communication system, comprising:
   a multiplier;
   an adder;
   a (W−1+N)-bit long first data storage for storing a local sequence, wherein W is a total number of correlation results and N is the bit-length of a local sequence which is used to correlate with an incoming sampled signal, and wherein the local sequence is repeated as many times as necessary to fill the first data storage;
   a [NK($T_c$/t)-bit long second data storage for storing data of a portion of the sampled signal, wherein K is a length of a sampled data unit in bits, $T_c$ is one chip interval, and t is a sampling interval; and
   a configuration in which the data in the second data storage is incrementally moved against the local sequence in the first data storage, wherein each increment is equal to the sampling interval, and wherein at every increment each data bit of the second data storage is multiplied by the corresponding bit of the first data storage, and wherein the result of all multiplications, at each location, are added together.

4. The path search correlator of claim 3, wherein the Communication system is Wideband Code Divison Multiple Access WCDMA or TD-SCDMA.

5. A path search system in a spread spectrum code division multiple access communication system, the path search system comprising:
   a multiplier;
   an adder;
   a first data storage for storing a local sequence that is used to correlate with an incoming sampled signal, wherein the first storage area is longer than the local sequence, and wherein the local sequence is repeated as many times as necessary to fill the first data storage; and
   a [NK($T_c$/t)-bit long second data storage for storing data of a portion of the sampled signal, wherein N is the bit-length of the local sequence, K is the bit-length of a sampled data unit, $T_c$ is one chip interval, and t is the sampling interval.

6. A path search structure in a Code Division Multiple Access (CDMA) system, the path search structure comprising:
   a multiplier;
   an adder;
   a first data storage area for storing a local sequence, wherein the first storage area is longer than the local sequence, and wherein the local sequence is repeated as many times as necessary to fill the first data storage;
   a second data storage area for storing data of a portion of the sampled signal, wherein the second data storage area is shorter than the first data storage area; and
   an arrangement wherein the data residing in the first data storage area is correlated with the data residing in the second data storage area while sliding the data within the second data storage area against the local sequence within the first data storage area and storing the results of the correlations.

7. The path search structure of claim 6, wherein the CDMA system is Time Division-Synchronous Code Division Multiple Access (WCDMA) or Time Division-Synchronous Code Division Multiple Access (TD-SCDMA).

8. The path search structure of claim 6, wherein the first data storage area is (W−1+N) bits long, and wherein W is total number of correlation results and N is the correlation algorithm (integral) length.

9. The path search structure of claim 6, wherein the second data storage area is [NK($T_c$/t)] bits long, and wherein K is the length of a data unit in bits, $T_c$ is one chip interval, t is the sampling interval, and N is the correlation algorithm (integral) length.

10. A RAKE receiver structure in a Code Division Multiple Access (CDMA) system, the RAKE receiver comprising:
    a Radio Frequency receiver;
    an Analog-to-Digital converter;
    a RAKE finger;
    a RAKE combiner; and
    a path search system, further comprising:
      a multiplier;
      an adder;
      a first data storage area for storing a local sequence, wherein the first storage area is larger than the local sequence, and wherein the local sequence is repeated as many times as necessary to fill the first data storage;
      a second data storage area for storing data of a portion of a sampled signal, wherein the second data storage area is shorter than the first data storage area; and
      a configuration wherein the local sequence residing in the first data Storage area is correlated with the data residing in the second data storage area while sliding the data within the second data storage area against the data within the first data storage area.

11. A RAKE receiver in a spread spectrum code division multiple access communication system employing a pilot-channel for path searching, the RAKE receiver comprising:
    a Radio-Frequency receiver;
    an Analog-to-Digital converter;
    a RAKE finger;
    a RAKE combiner; and
    a path search structure, further comprising:
      a multiplier;
      an adder;
      a (W−1+N)-bit long first data storage for storing a local sequence, wherein W is a total number of correlation results and N is a bit-length of a the local sequence which is used to correlate with an incoming sampled signal, and wherein the local sequence is repeated as many times as necessary to fill the first data storage; and
      a [NK($T_c$/t)]-bit long second data storage for storing data of a portion of the sampled signal, wherein K is the length of a sampled data unit in bits, $T_c$ is one chip interval, and t is the sampling interval.

12. A method of path searching in a Code Division Multiple Access (CDMA) system by correlating received data with a local sequence, the method comprising:
    receiving sampled and quantized data;
    holding at least a part of the received data in a buffer, wherein the buffer is
      [NK($T_c$/t)] bits long, and wherein K is the length of a data unit in bits, $T_c$ is one chip interval, t is the sampling interval, and N is the length of the local sequence;
    holding the local sequence in a storage area, wherein the storage area is larger than the local sequence and the buffer, and wherein the local sequence is repeated until the storage area is filled;
    sliding the buffer data, incrementally, against the local sequence storage area, wherein each increment is equal to the sample interval of the received data;
    multiplying, at each increment, each bit of the buffer data by the corresponding bit of the local sequence in the storage area;
    adding the results of all multiplications at each increment; and
    storing the results of the addition at each increment.

13. A path search method in a Code Division Multiple Access (CDMA) system, the method comprising:
    holding a repetition of a local sequence in a storage area larger than the local sequence;
    receiving a stream of sampled data;
    holding a part of the received data in a buffer shorter than the storage area,
    wherein the storage area is [NK($T_c$/t)] bit long, and wherein K is the length of a received data unit in bits, $T_c$ is one chip interval, t is the sampling interval, and N is the length of the local sequence;
    moving data of local sequence in the storage area, incrementally, against the received data in the buffer;
    multiplying the buffer data, bit-by-bit at each increment, by the corresponding data in the storage area; and
    adding the results of all multiplications at each increment.

14. A correlation system for path search of incoming signals in a code division multiple access communication system, the correlation system comprising:
    a multiplier;
    an adder;
    a first data storage area for holding a local sequence that is used for correlation with an incoming data sequence that is produced by sampling incoming signals, wherein the first data storage area is larger than the length of the local sequence, and wherein the local sequence is repeated to fill the available storage area;
    a second data storage area which is smaller than the first data storage area, for holding a portion of the incoming data sequence; and
    a configuration in which data in the second data storage area are incrementally moved against data in the first data storage area, wherein each increment is equal to a sampling interval of the incoming signals, and wherein at every increment each data bit of the second data storage area is multiplied by a corresponding bit of the first data storage area, and wherein the result of all multiplications, at each location, are added together.

* * * * *